United States Patent [19]

McGeary

[11] 4,268,744

[45] May 19, 1981

[54] SCORE PROCESSING SYSTEM FOR USE WITH ID CARDS

[76] Inventor: Thomas C. McGeary, 2412 Palos Verdes Dr. W., Palos Verdes Estates, Calif. 90274

[21] Appl. No.: 100,572

[22] Filed: Dec. 5, 1979

[51] Int. Cl.[3] ........................ G06F 15/20; G06F 7/02; G06K 19/06

[52] U.S. Cl. .................................... 235/375; 235/431; 235/493

[58] Field of Search ............... 235/375, 419, 431, 432, 235/434, 92 GA

[56] References Cited

U.S. PATENT DOCUMENTS

| | | | |
|---|---|---|---|
| 3,665,494 | 5/1972 | Baumoel | 235/92 R |
| 3,974,483 | 8/1976 | Brunson | 235/92 GA |
| 4,108,364 | 8/1978 | Tanaka et al. | 235/419 |

*Primary Examiner*—Daryl W. Cook

*Attorney, Agent, or Firm*—Nilsson, Robbins, Dalgarn, Berliner, Carson & Wurst

[57] ABSTRACT

A system is disclosed for use in cooperation with identification cards which incorporate a magnetic stripe and which functions to preserve a record and control the effect of scoring data, as a golfer's handicap. As disclosed herein, the system includes two components, a player unit and an office unit. The player unit processes the data on the identification card to issue score cards and indicate a player's handicap. The functions of the office unit include: entering fresh scores which are used to develop new handicaps, verifying data on the card and clearing any signals from the card that have resulted from mis-use and which inhibit the player unit. The system includes security aspects that discourage score manipulation or mis-use.

7 Claims, 4 Drawing Figures

SCORE PROCESSING SYSTEM FOR USE WITH ID CARDS

BACKGROUND OF THE INVENTION

A number of activities involve maintaining a record of personal scores which are subsequently significant. For example, several recent scores turned in by a golfer are processed to provide his current handicap. In that regard, common practice involves rather elaborate systems for computing and preserving records for individual players at their associated golf clubs. Traditionally, after each round of golf, each player's score is supposed to be accurately recorded for entry into the records and computation of his handicap. Periodically, a number of such scores are used to compute each player's handicap, the figures usually being posted.

Pursuing the above example, it is noteworthy that player handicaps are quite significant in golf not only in arranging play but additionally in determining the outcome of such play. In view of the importance of a player's individual handicap, economic or egotistical reasons may well tempt a player to engage in practices that will modify his true handicap. Such practices might be selective failures to turn in scores or the reporting of modified scores. Also, among certain players, a jesting attitude often prevails in many games, providing an incentive for players to modify the score records or handicaps of a fellow player. In view of these considerations, a need exists for an effective, economical, and convenient system for reliably providing fresh score or handicap information.

As suggested, situations similar to that described above also exist in other sports, as for example in bowling. The volume and complexity of calculations involved in these sports often result in the use of a computing service to develop the desired data. It is to be appreciated that normally, the practice involves some inconvenience, expense and delay. As a consequence, a need exists for an expeditious and economical system for maintaining player scoring data, as handicaps, that are current, accurate, and readily available.

In general, the present invention may be embodied for use with devices in the form of plastic identification cards, for example, bearing a recording medium as in the form of a magnetic stripe. The magnetic stripe may be of high energy material with the consequence that the record is durable and reliable. In the use of the system hereof in a golfing application, for example, the stripe records a player's handicap which is maintained current in accordance with his games of play. Additionally, the system incorporates secure facilities for improving the reliability of his indicated handicap.

Structurally, the system of the present invention incorporates apparatus for processing the record device or identification card bearing a recording medium, e.g. magnetic stripe. Specifically, information indicating score data, identification data, and reliability data is sensed from the card to accommodate any of a variety of operations. For example, in a golf application, the system may simply manifest the current handicap of the cardholder. Alternatively, the system may receive the score resulting from recent play, then process such score along with other data from the card to provide a fresh handicap. Embodiments of the system may also reveal a history of several recent scores. In the disclosed embodiment of the present invention, the system incorporates further structure for imprinting scorecards with current handicaps and further incorporates security structure for minimizing efforts to tamper with handicap data.

BRIEF DESCRIPTION OF THE DRAWINGS

In the drawings, which constitute a part of this specification, an exemplary embodiment demonstrating various objectives and features hereof is set forth as follows.

DESCRIPTION OF ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specific structural and functional details disclosed herein are merely representative, yet in that regard they are deemed to provide the best embodiment for purposes of disclosure and to provide a basis for the claims herein which define the scope of the present invention.

Figure 1:
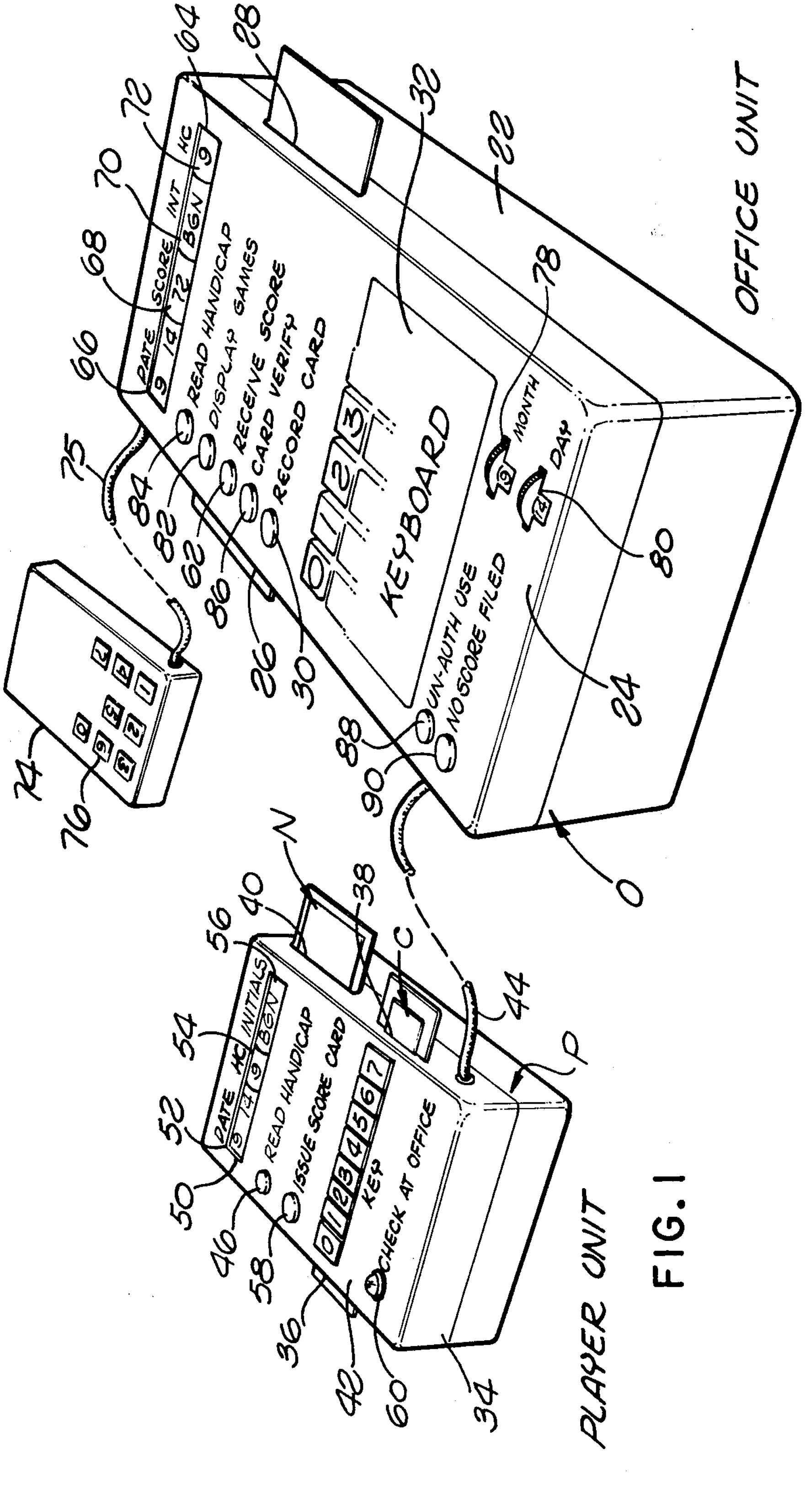
FIG. 1 is a perspective view of a system constructed in accordance with the present invention.

Referring initially to FIG. 1, the system of the present invention is illustrated to be embodied at two separate locations. Specifically, a player unit P is used by individual players while an office unit O is accessible only to authorized office personnel. Of course, a variety of techniques and structures may be employed utilizing the present invention; and in that regard, it is noteworthy that a single unit may be employed or alternatively several units might be used as in the form of a single office unit operating in cooperation with more than one player unit.

Pursuing the illustrative example herein, the functions of the system are divided with certain operations being performed at the player unit P while other operations are performed at the office unit O. Specifically, while both units may be operated to display a player's handicap, the player unit P is otherwise employed to issue scorecards. Exclusive functions of the office unit O include: displaying a record of prior games, verifying a card and recording a fresh score.

Figure 2:
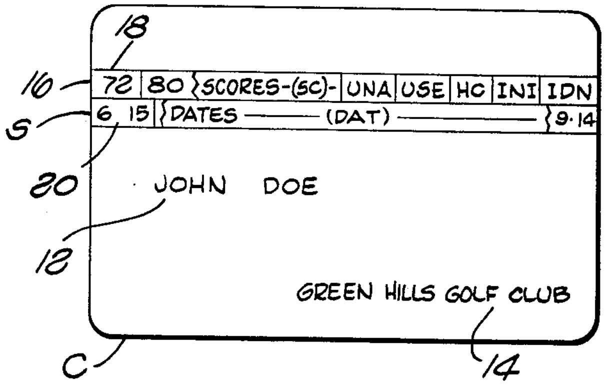
FIG. 2 is a top plan view of an identification card for use in association with the system of FIG. 1.

Prior to considering the structure of FIG. 1 in greater detail, reference will first be made to FIG. 2, illustrating an exemplary form of card for use with the structure of FIG. 1. The card C may take a form which is currently in widespread use, e.g. a sheet of plastic bearing various indicia as well as a magnetic stripe S. The indicia on the card C may or may not be embossed and may, of course, vary with specific applications. The illustrative card C carries the name 12 of the holder and the name 14 of the issuing organization.

As with regard to the structures of the card, the magnetic stripe may vary widely. However, the recording format for the stripe S is indicated in FIG. 2. Actually, assuming the stripe S is magnetic medium, the record thereon will be invisible. However, the representative data recordings are indicated in FIG. 2, in a perceivable form. Specifically, an upper track 16 (left to right) records a series of score data words 18 for the cardholder, each of which are designated by the letters SC and comprise six binary bits. The second track 20 carries a series of dates, indicated by the letters DAT, and which are individually associated to identify each of the scores 16, designated SC. The date words or data DAT each comprise nine binary bits.

Following the scores SC on the track 16, are a series of special data cells. Specifically, the word data bit UNA is a single bit and if false indicates an attempted unauthorized or improper use of the card.

The data USE is another single binary bit and when false indicates that the identification card has been used to obtain a scorecard with the consequence that it may not be used to obtain another until a score is reported. The nature and operation of the system with regard to these data bits is considered in greater detail below.

The data word HC carries the player's current handicap and comprises five bits. Following that data, the data word INI reveals the cardholder's initials and takes the form of a thirty-six bit word. Finally, the data word IDN indicates an assigned identification number of the cardholder of four bits. The arbitrarily assigned identification numbers may be equivalent to values from zero to seven.

It may now be seen that the magnetic stripe S records the recent scores of a player or cardholder, from which his handicap is computed. The handicap is also recorded along with certain security data. In addition to carrying the individual scores, the card also records the dates when such scores were recorded. For convenience, the data is indicated in designated signals as indicated above and as set forth below in chart form. The signal designations used herein appear in the following chart to afford a convenient reference.

| | SIGNALS OR DATA | |
|---|---|---|
| Designation | Name | Bits |
| IDN | Identification number | 3 |
| INI | Initials | 36 |
| HC | Handicap | 5 |
| DAT | Date | 9 |
| SC | Scores | 6 |
| USE | Use of issued scorecard | 1 |
| UNA | Unauthorized use of ID card | 1 |
| O | Check at office (command) | 1 |
| RHC | Read handicap (command) | 1 |
| ISC | Issue scorecard (command) | 1 |
| DIS | Display games (command) | 1 |
| RCS | Receive score (command) | 1 |
| CSC | Clear scorecard (command) | 1 |
| VC | Verify card (command) | 1 |
| RSC | Read scores (command) | 1 |
| CLU | Clear improper use (command) | 1 |
| RIC | Record identification card (command) | 1 |

Returning now to further consideration of FIG. 1, the office unit O comprises a housing 22 containing operating structure and supporting an operating panel 24. At opposed sides of the housing 22, card entry and exit ports are defined for identification cards. Specifically, an entry slot 26 is located at the left side of the housing 22 while an exit slot 28 is located on the opposed right side of the housing 22. To process a card, commands are given on the panel 24. Accordingly, the desired operations are performed.

Consideration will now be directed to the various operations of the systems with regard to the identification card C as depicted in FIG. 2. As indicated above, a variety of operations may be performed using the card C; however, it may facilitate an understanding of the system to pursue the various functional operations somewhat chronologically in the likely sequence of their occurrence. Therefore, assume initially that a fresh identification card C is to be recorded for a new member of the club or other facility. That is, a card C as illustrated in FIG. 2 has been designated for the holder or member and will now be recorded for his use. For such a person, individual scores are not available and consequently are not recorded. In essence, on the basis of some authority, the new cardholder has been assigned a specific handicap HC. The cardholder also has identification in the form of his personal monogram or initials for deriving the signals INI. Also, he selects or is assigned a number (any number from 0 to 7) somewhat as his confidential personal identification. Of couse, various forms of personal identification structures are well known and might be incorporated herein.

The card C for the holder is entered at the entry slot 26 and a "record card" button 30 is depressed to activate a keyboard 32 which is then used for forming signals representative of the data: HC, INI, and IDN. In accordance with a standard format, the data signals are formed by the keyboard 32 and recorded in the locations indicated on the card C (FIG. 2).

After the card is recorded, it is moved from the housing 22 through the delivery slot 28 (FIG. 1). The card is now ready for use in association with the system to provide the current handicap of the player, regulate its own use, obtain scorecards properly, and afford security against mis-use.

Continuing with the description of functions, assume next that the holder of the exemplary card C is ready to play a round of golf. Preliminarily, he uses the card at the player unit P to either verify his handicap or to obtain a scorecard.

The player unit P is located for convenient access by starting players and includes a housing 34 with an entry slot 36 for the identification card C (FIG. 2) on one side and two opposed deliver slots. First, a slot 38 returns the identification card C while a slot 40 supplies imprinted scorecards N. The slots 36, 38, and 40 are at the sides of the housing 34, while the top of the housing comprises a control panel 42 which is actuated by the player or cardholder. It is noteworthy that the player unit P is connected to the remote office unit O through a cable 44.

With the insertion of an identification card through the entry slot 36, the cardholder may depress a "read handicap" button 46 along with the particular key or button for his number in set 48. For example, if the cardholder's number is "six", he simply depresses the "read handicap" button 46 and the button designated by the numeral "six" in the set 48. As a consequence, his handicap and initials are sensed from his card and displayed along with the date on a light panel 50. Specifically, the date is displayed in a section 52, his handicap appears in a section 54, and his initials appear in a section 56.

The display for the player endures for several seconds during which his fellow players may observe his handicap as well as confirming his initials and the propriety of the display by the indication of the present date. Momentarily, the display ceases and the identification card C is returned to the player through the delivery slot 38.

The "read handicap" operation may or may not be performed, depending upon whether or not the player wishes to confirm the record of his card. After that operation, or alternatively to such an operation, the cardholder may actuate the player unit P to issue his scorecard N. Specifically, to obtain the scorecard N, the player inserts his identification card C as explained above and in this instance depresses a button 58 along with his identification number key in the set 48. In this instance, if the cardholder's identification card C is in order, a scorecard N is delivered from the delivery slot 40 imprinted with the player's initials and handicap. Thus, a hard copy record indicates his handicap for convenient verification. Of course, in some instances it may be desired to assign alternative or supplementary identification beyond personal initials; however, in one instance, such identification was found to be quite satisfactory.

Under certain circumstances as described in detail below, the identification card may not be in proper order. Disorder can be as a result of: failure to report a score, mis-use, or attempted fraudulent use of the identification card. In such an event, a lamp 60 on the panel 42 is illuminated instructing the cardholder to present his card for verification at the office unit O. The details of that operation will be considered below.

To pursue the exemplary sequence of operations, assume that the player obtains a scorecard N along with his returned identification card C and proceeds to play a round of golf. Thereafter, his scorecard N and identification card C are to be presented at the office unit O so that his score can be recorded on the identification card C and reflected in his handicap. That operation will now be explained.

The operator of the office unit O inserts the player's identification card in the office unit O through the slot 26, somewhat concurrently depressing a button 62 adjacent the legend "receive score". As a consequence, the keyboard 32 is energized to accept the score which will be keyed into the office unit O in a pre-established format. Following such activity, the score is recorded on the card, the player's handicap is freshly computed and also recorded on the identification card. The identification card is subsequently delivered from the slot 28.

In certain instances, depending upon the responsibility and authority of persons operating the office unit O, it may be desirable to require approval by the cardholder to modify his card. To accommodate such control, an eight-number key panel 74 is provided for convenient access to the player. Essentially, the panel 74 provides a set of eight keys 76 the proper one of which must be depressed by the card holder before the operator of the office unit can actuate the keyboard 32.

After a score is received and the related functions performed by the office unit O, the player's identification card is returned to him carrying his current handicap along with his recent scores. In the case of a newly issued card, some time will be required to accumulate sufficient scores to compute the handicap; however, after such scores are available, the handicap is freshly computed after each game and recorded on the card so that there is essentially no delay between the time when scoring information is available and it is reflected in the player's handicap.

It is to be noted that the office unit 24 includes a pair of date wheels 78 and 80 (lower right) for establishing the current "month" and "day". These wheels are associated with printwheels and rotary signal generators to provide signals indicative of the date, i.e. signals DAT. A Julian format may be used and decoded to control the date displays in either the section 66 of the office unit O or section 52 of the player unit P. Also, the date signals DAT are recorded along with each entered score as described below with respect to the record format (FIG. 2). Consequently, a record is preserved not only of the pertinent recent scores but also of the dates on which such scores were made.

To verify the record, an identification card C may be processed by the office unit O to provide a sequential readout of each of the recorded scores. With an identification card in the unit O, the operation is initiated by actuating a button 82 adjacent to a legend "display games". Upon such actuation, each of the scores recorded on the stripe S (FIG. 2) is sensed and exhibited in the section 68 of the display panel 64 concurrently with a date in section 66. The display may be provided for varying intervals of time; however, as an exemplary display, each score and the accompanying date is for a duration of seven seconds. At the conclusion of the displays, the office unit O returns to its quiescent state and the identification card C is returned through the slot 28.

It is to be noted that in addition to a comprehensive display reviewing the record as explained above, the office unit O may also simply read a player's handicap as explained previously with reference to the player unit P. That operation is performed by the office unit upon a command initiated by depressing a button 84 adjacent a legend "read handicap".

To assure that scores are reported, the player unit P is inhibited from issuing a scorecard N until the score from a previous scorecard has been reported. This operation will be explained with reference to the identification card C of FIG. 2. When the player unit P issues a scorecard, the recorded binary bit USE is altered from a "true" to a "false" state. When the USE bit is "false", the player unit is inhibited from issuing another scorecard N until that bit is reset or cleared to a "true" state. Such a clearance occurs when the identification card C is entered in the office unit O to receive a score from the last scorecard. That is, in the course of recording a fresh score, the office unit O resets the USE bit "true" preparatory to the issuance of another scorecard N by the player unit P.

The identification card C also carries a data bit UNA which is false in the event of an unauthorized use of the card. For example, an identification card C may for a time come into the possession of someone other than the holder, who might try to alter the holder's handicap. Such an occurrence is detected when the fraudulent user of the card depresses the wrong numerical-identification key on either the panel 50 (player unit, FIG. 1) or the panel 74 (office unit, FIG. 1). Upon such an occurrence, the card receives a false bit indicating it is temporarily invalid as a result of mis-use.

If an identification card is used out of sequence or becomes temporarily invalid, with attempted further use the lamp 60 (FIG. 1, player unit P) is illuminated instructing the player to "check at office". Under such circumstances, the player is expected to present his card at the office unit O with the request for a verification which is performed by inserting the card and depressing a button 86 adjacent a legend "card verify". Thereupon, the system senses the bit UNA (unauthorize use) and/or the bit USE (scorecard issued) and indicates the difficulty by illuminating one of a pair of buttons 88 or 90.

The button 88 is designated "unauthorized use" (associated with UNA) while the button 90 is designated "no score filed" (USE). Normally, either indication will prompt the operator of the office unit to pursue some questions with the objective of clarifying the situation and learning what has happened. Of course, various external actions may be taken, depending on the circumstances. As a further part of the procedure, the illuminated button 88 or 90 will normally be depressed to clear the recorded false bit (indicating difficulty) from the identification card C.

Figure 3:
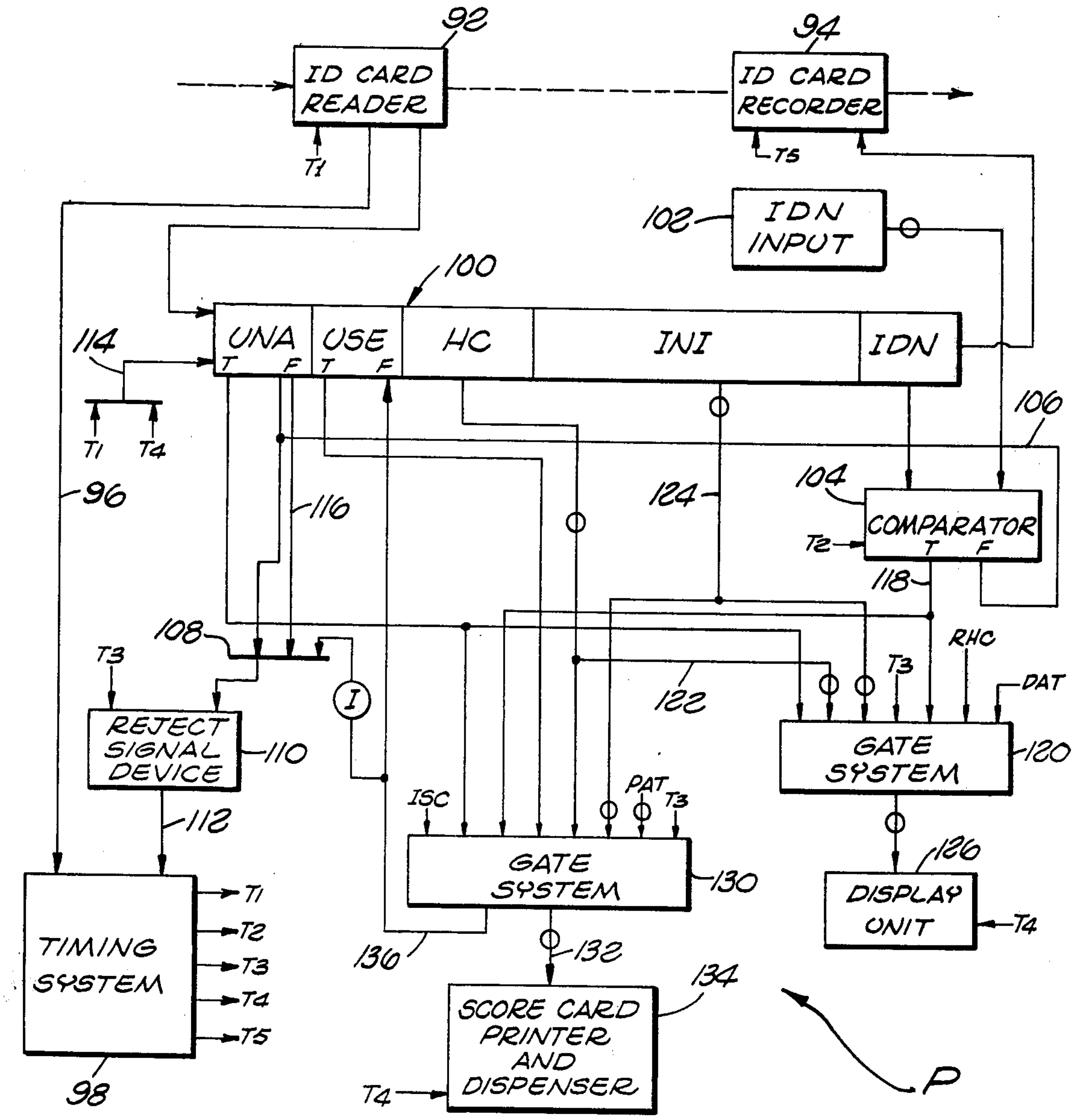
FIG. 3 is a block diagram of one portion of the system of FIG. 1.

To complete an understanding of the structure of the system reference will now be made to FIGS. 3 and 4, respectively illustrating the apparatus within the player unit P and the office unit O. Initially, consider the structure of the player unit P as represented in FIG. 3. The unit P is capable of performing either of the operations "read handicap" (command signal RHC) or "issue scorecard" (command signal ISC).

The player unit P as depicted in FIG. 3 incorporates card handling structure specifically in the form of an identification card reader 92 and an identification card recorder 94. Various forms of such devices are well known and in widespread commercial use. In accordance with somewhat conventional operation, the card reader 92 senses the leading edge of an inserted card C, and is accordingly actuated to move the card while concurrently providing a pulse through a conductor 96 to initiate a cycle of operation by a timing system 98 (FIG. 3, lower left). Essentially, the timing system provides a series of sequencing signals T1, T2, T3, T4, and T5. These are two-state or binary signals and each commands certain operations during the interval when it is in a high state.

The player unit P functions solely in cooperation with the upper track 16 on the card C and only uses a portion of that tract. Specifically, the portion of the tract 16 which records the history of prior scores is passed over by the card reader 92. Only the data relating to use of the card, the handicap, and the identification of the assigned holder is sensed to provide electrical signals which set the information into a register 100. Specifically, signals representative of the data: UNA, USE, HC, INI, and IDN are set in the register 100 (FIG. 3, upper central). Recapitulating, the data indicates:

UNA: binary bit for indicating unauthorized use of ID card
USE: binary bit for indicating use of ID card to obtain scorecard
HC: data word indicating cardholder's handicap
INI: data word indicating cardholder's initials
IDN: data word indicating cardholder's confidential identification number From the register 100, the data signals control various manipulations, depending upon the command function, and thereby accomplish the desired operation. Again recapitulating, the player unit selectively performs two functions, either exhibiting the handicap of the identification card or issuing a scorecard imprinted with the initials and handicap of the assigned identification cardholder.

The detailed structure of the player unit P may now be best explained by pursuing exemplary operations and introducing components concurrently with the explanation. Accordingly, assume that an identification card is placed in the card reader 92 with the result that the register 100 is loaded as explained above and as illustrated in FIG. 3. Further assume that the assigned cardholder depresses the button 46 (FIG. 1) to command the exhibition of his handicap as it is recorded on the identification card. As a consequence, the binary signal RHC will be set high for a predetermined interval. Further assume that the use and history of the card is such that both the signals UNA and USE are clear or true with the consequence that neither will inhibit use of the card.

After the card is accepted, the player unit P awaits further action by the operator to depress the proper numerical key of the set 48 (FIG. 1). That is, the system awaits the depression of one of the numerical keys in the set 48 to confirm that the operator is in fact the assigned holder of the identification card. The depression of a numerical key in the set 48 results in the production of a three-bit word (IDN) by a digital coding unit or IDN input device 102 (FIG. 3, upper right). The input signal IDN is supplied through a cable from the input 102 to a comparator 104 which also receives signals IDN from the register 100 as they were recorded on the card C.

The comparator operates during an interval T2 to compare the two data signals IDN, and as a consequence provides an output that is either true or false. In the event that the comparison is not proper, the comparator provides a false signal through a conductor 106 to set the signal UNA in the register 100 false thereby indicating that a fraudulent or improper effort has been made to use the identification card C. The false state of the UNA bit will be subsequently recorded on the identification card to inhibit use of the card until the bit is cleared.

The false signal in the line 106 is also supplied through a connection gate 108 to a reject device signal 110 (FIG. 3, lower left). As a consequence, the lamp 60 (FIG. 1) is illuminated instructing the operator to check at the office. Concurrently, a binary signal is supplied from the device 110 through a conductor 112 to the timing system 98 advancing the signal sequence directly to provide the sequence of timing signal T4. As a consequence, the signal T4 at the input 114 to the register 100 clears the contents of the register 100 into the recorder 94, prompting the termination of the signal T4 and the origination of the signal T5 with the result that the data from the register 100 is recorded at the appropriate location of track 1 on the identification card C.

It may thus be seen that an improper or fraudulent use of the identification card not only aborts the specific operation involved but also sets the data bit UNA false to inhibit subsequent use of the card. Specifically in that regard, subsequent use of the card C prior to clearing the data bit UNA results in a high signal from the false side of the UNA-bit binary that is applied through a connection gate 108, again to actuate the reject signal device 110. Consequently, erroneous or fraudulent use of an identification card or subsequent use after such an event (prior to clearing) produces an abortive operation with an indicating signal.

Most usually, the card C is not likely to be misused and as a consequence, the comparator 104 (right central) will indicate a true comparison by providing a high signal in a conductor 118. That signal is applied to a gate system 120 which receives signals representative of the data HC (handicap) and the holder's initials (INI) from the register 100 through cables 122 and 124.

With the occurrence of the high signal in the conductor 118, along with a high level of the timing signal T3, and a high level for the command signal RHC, the gate system 120 passes the applied data signals HC and INI.

Specifically, the gate system supplies the handicap signal data HC, the initial data signals INI, along with date data signals DAT (from the office unit O) to a display unit 126 which embodies the illuminated panel 50 (FIG. 1). Accordingly, during the interval of T4 (being in its high state) the display unit 126 drives the illuminated panel to provide a visual display of the handicap, the initials, and the date for the predetermined interval. During the same time, the contents of the register 100 is returned to the recorder 94 preliminary to recording during the interval T5. Thereafter, the card C is returned and the timing system 98 goes into a quiescent state, providing none of the timing signals T1–T5 high and simply awaiting the occurrence of another command signal in the conductor 96.

Pursuing a consideration of the various operations, assume next that with the insertion of his card, the assigned cardholder depresses the button 58 (player unit P, FIG. 1) to command the issuance of a scorecard. Also assume that he strikes the proper numerical key for his identification in the set 48. Consequently, the binary signal ISC will be high and the comparator 104 (FIG. 3, middle right) will indicate a true comparison providing a high binary signal in the conductor 118. Further assume that the card involved has not been misused with the consequence that both the binary bits representing the data UNA and USE are in a true state. As a consequence, during the period of the timing signal T3, a gate system 130 (FIG. 3, lower central) is fully qualified and passes signals representative of the data words HC, INI, and DAT through a cable 132 to a scorecard printer and dispenser 134.

Recapitulating, on command, the player unit P delivers data signals from the identification card C for a player to the scorecard printer and dispenser 134 which signals represent the player's handicap (HC), the player's initials (INI), and the current date (DAT). Such signals control the printer and dispenser 134 to imprint a scorecard with the handicap, the initials, and the present date, after which the scorecard is dispensed. In general, a wide variety of well known and widely used printing devices may be employed; however, in one form, the printer and dispenser 134 may simply include a number of printwheels which are rotated to reflect the received data signals by setting the type for the desired print in printing position. The wheels are then actuated in a single stroke to imprint the scorecard. That operation occurs during the interval of the timing signal T4. However, at a time prior thereto, the gate system 130 provides a signal through a conductor 136 to set the USE bit of the register 100 in a false state. Specifically, the USE bit is set false, thereby indicating that a scorecard has been issued.

It is to be recalled that when recorded on the identification card C, a false value for the USE bit will inhibit the operation of the player unit P from issuing another scorecard. That is, as the USE bit is false, the true signal from the USE bit register is low and the gate 130 is inhibited. Accordingly, a control is provided to discourage the practice of players selectively turning in scores or scorecards. As explained above, and as treated in detail below, when the identification card is used at the office unit O to report a score, the USE bit will be reset true so that another scorecard can be obtained.

During the interval of the timing signal T4, not only is the scorecard dispensed by the printer and dispenser 134 but additionally the contents of the register 100 is returned to the recorder 94 to be recorded on the identification card during the interval of the timing signal T5. As a consequence, the identification card C is returned to the holder (marked to prevent its use to obtain another scorecard). He also receives a scorecard which bears his initials, his handicap, and the date.

Continuing with the exemplary sequence of events, the assigned cardholder will now be assumed to have completed a round of golf, the score of which should be turned in at the office as current data relating to his handicap. As explained above, if the player should attempt to obtain another scorecard (using his identification card C), the player unit P will not dispense a scorecard but rather will instruct the player to check in at the office. However, assume that in accordance with proper procedure, upon completing the round of golf, the scorecard is taken to the office and delivered to an operator of the office unit O pursuant to reporting the score.

At the office unit (FIG. 1), the sequence will be as follows. The operator inserts the identification card C, depresses the button 62 (receive score), and instructs the player to depress the specific one of the keys 76 to indicate his confidential number. Thereafter, the operator utilizes the keyboard 32 to enter the fresh score on the identification card. The office unit O then enters the fresh score and additionally deletes the most time-remote score after which the player's handicap is computed on the basis of fresh scores. Additionally, the USE bit is reset to a true state on the identification card C for use to obtain another scorecard. With the completion of these operations, the scorecard is dicharged from the office unit O through the slot 28 and is returned to the player for subsequent use.

Figure 4:
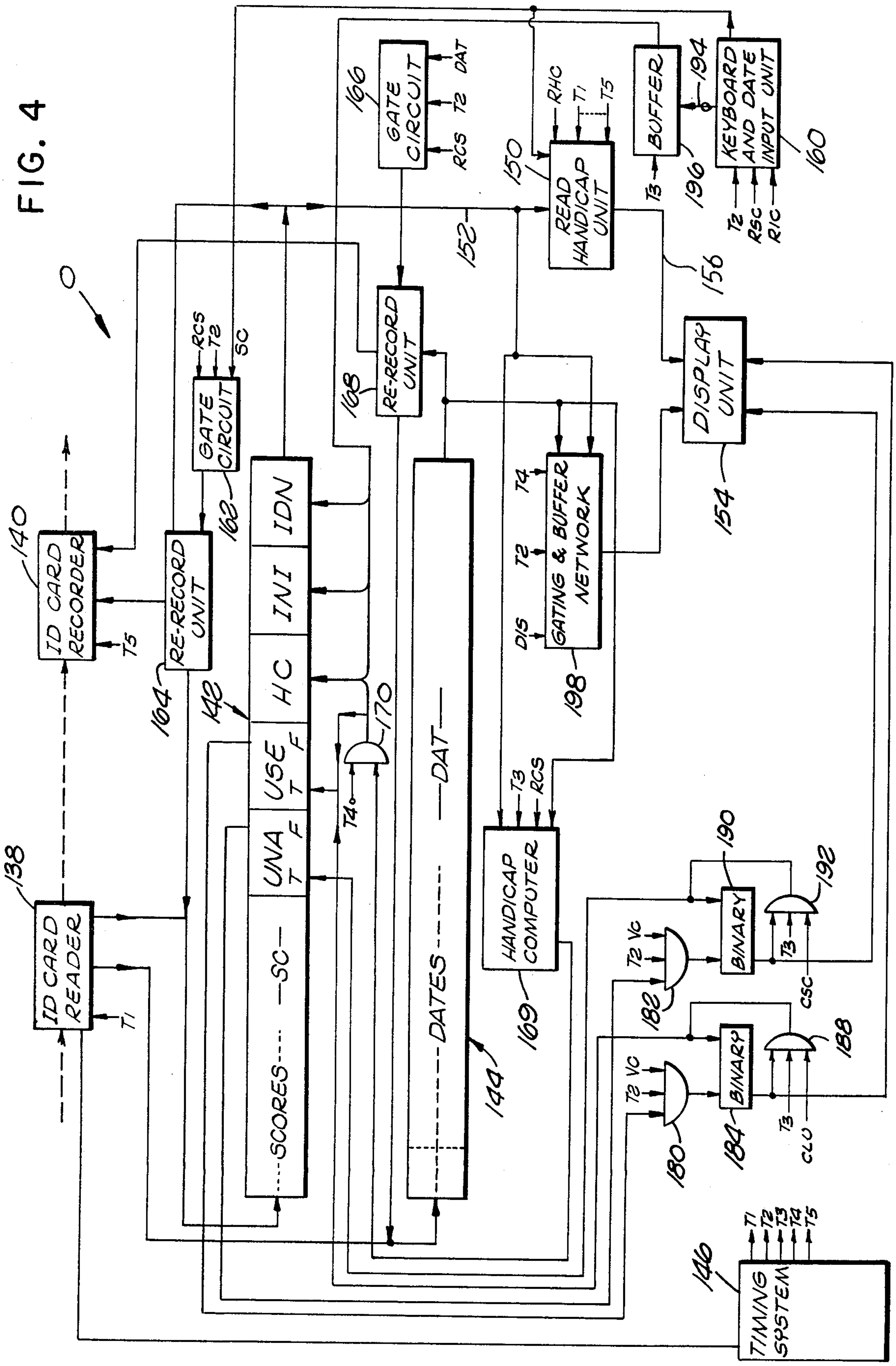
FIG. 4 is a block diagram of another portion of the system of FIG. 1.

To consider these operations with regard to structure, reference will now be had to FIG. 4. Initially, it is noteworthy that the office unit O incorporates a card reader 138 and a card recorder 140 which are similar to forms of those units as described above with respect to FIG. 3. Another similarity with the structure of FIG. 3 involves registering the recorded contents of the card C. However, in the system of FIG. 4, a pair of registers 142 and 144 are provided to receive the full record from both of the tracks 16 and 20. That is, the register 142 receives the score signals SC along with the personal and control data represented by the signals UNA, USE, HC, INI, and IDN. In a somewhat similar manner, the register 144 receives the date signals DAT on which individual golf scores were recorded.

The office unit O as represented in FIG. 4, involves considerably more data processing than occurs in the player unit P (FIG. 3). In that regard, the data from the identification card C first is moved into the registers 142 and 144. Then it may be cycled back into these registers, for access and processing. With the completion of such processing, the data is modified and finally moved from the registers 142 and 144 to freshly record the individual tracks 16 and 20 on the card C.

The system of FIG. 4 also includes a timing system 146 (lower left). Again, the system 146 functions to provide individual binary timing signals (T1, T2, T3, T4, and T5) in high states to sequence the operations.

As indicated above, the office unit O incorporates structure for displaying a player's handicap from the signals HC recorded on the identification card C. In essence, the structure of the office unit (FIG. 4) for performing that operation substantially coincides to the structure previously described with respect to the player unit P as depicted in FIG. 3. Such structure is provided in the read handicap unit 150 (FIG. 4, central right) which is connected to receive the contents of the register 142 through a signal path 152, and provide signals to a display unit 154 (FIG. 4, lower central) through a signal path 156. The unit 150 is connected to receive the command signal RHC, along with select timing signals T1–T5.

The operation of the office unit O to receive a fresh score and update the handicap data word HC will now be considered. In general, the operation involves supplying the player identification card C to the card reader 138 and manually actuating the keyboard 32 (FIG. 1) to provide input signals from a signal source or data input unit 160 (FIG. 4, lower right). Of course, a wide variety of structures are well known and widely used for providing representative digital-signal data in response to depression of individual data keys.

Pursuing the operation of entering a fresh score in somewhat greater detail, the operator initially depresses a button 62 (FIG. 1) designated "receive score" which provides a high form of the command signal RCS for a predetermined duration. Depending upon the manner in which the office unit O is used and located, it may be desirable to require the insertion of a key to enable the generation of the signal RCS. Of course, the key may take any of a variety of forms ranging from a traditional metal lock key to a plastic card.

During the first phase of operation (period of signal T1 being high) the data from the tracks 16 and 20 is sensed from the card C and placed in the registers 142 and 144. Next, with the record signal RCS in a high state, the scores of prior games (represented by the signals SC) are shifted one location in the register 142 with the result that the oldest score is lost and space becomes available for the fresh score. Such shifting operations in a register are well known and a wide variety of structure are in widespread use to accomplish such a displacement along with the insertion of fresh data. Specifically, in the system of FIG. 4, the operation is performed by moving the contents of the register 142 through and a re-record unit 164 along with signals from a gate circuit 162 copper right during the interval of T2. It is to be noted that the gate circuit 162 and the display unit 154 receive the fresh score signal SC (current score) from the keyboard and data input unit 160.

A similar shifting and entering operation is performed on the data contained by the register 144 (center), i.e. the dates of the record scores. Specifically, the current data is represented by signals DAT applied to a gate circuit 166 (central right) along with the signal RCS and the timing signal T2. Consequently, the shifting and insertion operation is performed by a re-record unit 168, cycling the contents of the register 144. At the conclusion of these operations, the registers 142 and 144 certain current information on scores and dates including the latest score and data.

The next operation in the sequence involves the calculation of the fresh handicap during the interval of T3. Specifically, during the interval of T3, the contents of the register 142 is supplied through the data path 152 to a handicap computer 169 for processing. Such a transfer is commanded by the signal RCS being in a high state. The handicap computer may take a variety of forms, for example, a golf computer is disclosed in U.S. Pat. No. 3,665,494 issued May 23, 1972. In an alternative embodiment, the computer may take other forms as, for example, a bowling score computer, a form of which is disclosed in U.S. Pat. No. 3,974,483 issued Aug. 10, 1946.

Operationally, the handicap computer 169 provides signals representative of the newly computed handicap, i.e. signals HC. During the interval of the timing signal T4, such signals HC are supplied from the handicap computer 169 through an "and" gate 170 to register the fresh handicap HC in the register 142. The signals concurrently reset the USE bit to a true state thereby indicating the score has been entered. Accordingly, the registers 142 and 144 contain current information reflecting the fact that a score has been received and concurrently the handicap data word HD adjusted if appropriate.

During the next time interval (indicated by the signal T5 being in a high state), the registers 142 and 144 are cleared through the units 164 and 168, respectively, to the recorder 140 for freshly recording the tracks 16 and 20 on the identification card C. At this point it is perhaps noteworthy to observe that almost no delay exits between the time when a fresh game of golf is completed and the score of that game is reflected in the players's handicap. Therein lies a distinct advantage of the present system.

As indicated above, the office unit O may be employed to perform a number of functions other than displaying the present handicap and entering a fresh score to compute the current handicap. Specifically, the unit may be employed to verify the status of a card in response to an instruction from the player unit to "check at office". As indicated above, such an instruction occurs when a card is found to carry an indication that it has been improperly or fraudulently used, or that a scorecard has been obtained yet no score has been reported. An identification card is verified by inserting the card through the slot 26 (FIG. 1) of the office unit O. Thereafter, the operator depresses the button 86 to provide the command "card verify" as manifest by the signal VC. The operations attendant such command will now be considered with reference to FIG. 4.

As previously explained, with the insertion of the card, during the interval manifest by the timing signal T1 being in a high state, the register 142 is loaded with the contents of the score track. Thereafter, the states of the data digits UNA and USE are indicated at a pair of "and" gates 180 and 182 (FIG. 4, lower left). Specifically, the signal UNA is applied to the gate 182 along with the timing signal T2 and the verifying command signal VC. Concurrently, the signal USE is supplied to the gate 180 along with the timing signal T2 and the verifying command signal VC. Note that the signals representative of the UNA and USE bits are from the false or negation side of the bit register with the consequence that high binary signals are produced in the event that bit is false or set to prohibit use of the identification card C.

The gate 180 is qualified during the interval of signal T2 of a card verification, providing that the USE bit is false, i.e. the card C was used to obtain a scorecard yet no score was reported. As a consequence, the "and" gate 180 is qualified and sets a binary 184 which actuates a lamp in the button 90 (FIG. 1) associated with the display unit 154. As a consequence, the lamp in the button 90 indicates that no score was filed after the issuance of a scorecard. At that stage, the situation is best pursued on a personal basis depending upon individual policies and objectives for the club or other organization. Perhaps everyone is entitled to an occasional slip in procedure. However, habitual occurrences may prompt firm action.

In any event, it is likely that after the matter has been treated, it will be desired to remove the limitation on the card's use by resetting the USE bit true. To accomplish such clearance, the button 90 (FIG. 1) is depressed with the result that a signal CLU "clear improper use" becomes high thereby qualifying an "and" gate 188 during the interval of the signal T3. Qualification of the gate 188 resets the binary 184 and resets the USE bit to a true state. It is noteworthy that the USE bit is also reset during the interval of the timing signal T4 when a fresh score is recorded and upon the instance of the gate 170 being qualified. Thus, the USE bit for inhibiting use of the card is cleared either upon a direct command or upon the operation of entering a score on the identification card.

Somewhat similarly, the UNA bit also will normally be reset after an indication of tampering or improper use has been called to the attention of responsible personnel. Specifically, the occurrence of tampering resulting in a high state for the negation of the UNA bit (indicating a false state), qualifies the "and" gate 182 during the interval of timing signal T2 and the verification signal VC. As a result, a binary 190 is set to qualify an "and" gate 192 during the interval of timing signal T3. Additionally, the output from the binary 190 illuminates a lamp in the button 88 (FIG. 1) manifesting an improper use of the identification card. With a decision to clear the card, the depression of the button 88 develops a signal CSC in a high state so that the gate 192 is qualified to reset the UNA bit in the register 142 preparatory to recording the card.

At the conclusion of such operations, the contents of the register 142 is again supplied to the identification card recorder 140 to freshly record the tracks 16 without the presence of inhibiting bits. Thus, information suggestive of misconduct or breaches in security are brought to the attention of responsible personnel; however, thereafter the card is readily cleared for subsequent use in the normal fashion.

As discussed above with respect to the office unit of FIG. 1, the structure may be employed to record the handicap, the initials, and the identification on a fresh card. That operation is performed by inserting a fresh card in the office unit O. Normally, the tracks 16 and 20 of the card will bear no previous recording with the consequence that the registers 142 and 144 remain clear after the card has been read. With the application of the signal RIC (record identification card) in a high state at the input unit 160 (FIG. 4, lower right), the keyboard is enabed to provide digital signals indicative of the handicap, the holder's initials, and his identification number. Specifically, data is encoded as the representative signals HC, INI, and IDN. Such signals then are supplied from the unit 160 through a cable 194 to a buffer 196. Subsequently, during the interval of the timing signal T3, the signals HC, INI, and IDN are entered in the register 142 in a parallel fashion. Accordingly, the initial record is produced which is subsequently recorded upon the card when the contents of the register 142 is transferred through the re-record unit 164 to the recorder 140. The card C then will be continued in its use until such time as a sufficient number of scores have been recorded to formulate a basis for computation of a handicap as required by the computer 168.

A final alternative operation of the office unit O involves sequentially reading each of the dated scores from the tracks 16 for display on the panel 64 (FIG. 1). In such operation, the contents of the registers 142 and 144 are transferred to a gating and buffer network 198 (FIG. 4, central) during the occurrence of a command signal DIS (display games). From the network 198, each game and date is sequentially supplied to the display unit 154 for a metered time interval whereby the intervals of timing signals T2 through T4 are expanded. Of course, a variety of techniques may be employed; however, some seven seconds for each display has been determined in one instance to be satisfactory. As a consequence, the operator of the office unit O as well as the player cardholder may monitor the content of the card to determine and assure that the games as recorded coincide with present recollection. Of course, if a challenge is made, internal policies will come into play. In any event, the system has the operating capability to reveal the full registered content of the tracks 16.

In view of the above description, it will now be apparent that the system of the present invention may be effectively employed to facilitate and control the use of identification cards C carrying a magnetic medium which is utilized for scoring or related records as in maintaining a readily available and current player handicap. The system incorporates safeguards, as explained above, to discourage such practices as: failure to report scores, card tampering, or assumption of an improper handicap. Additionally, the system functions to provide current handicap or scoring information for players which is readily available and facilitates minimum internal records. Of course, the system can be implemented using a wide variety of different techniques and structures; and in that regard it is to be appreciated that the system as presented herein is merely an illustrative embodiment deemed best for present purposes; however, recognizing that the scope hereof shall be in accordance with the claims as set forth below.

What is claimed is:

1. A control system for scoring, as in golf, for operation with a card or the like, bearing a record medium comprising:

means for sensing said record medium to provide signals from a specific card identified with a specific person and representative of a scoring composite for that person;

a controlled access input panel for forming signals representative of a current score by said specific person;

computer means for receiving said signals representative of a current score and said signals representative of said scoring composite to compute a fresh scoring composite;

means for recording said signals on said card, updated to include said current score; and means for regulating the operation of said means for recording to verify recording for said specific person on said specific card.

2. A system according to claim 1 wherein said means for regulating includes an input device for receiving confidential code data from said specific person.

3. A system according to claim 1 wherein said means for regulating includes means for recording on said card check signals indicative of a playing commitment and means controlled by said check signals for conditioning the operation of said means for recording.

4. A system according to claim 3 further including means for issuing a scorecard to manifest said playing commitment.

5. A system in accordance with claim 4 wherein said means for issuing a playing scorecard includes means for inprinting said scorecard with scoring information.

6. A system according to claim 1 wherein said means for regulating includes means for recording personal identification signals for said specific person on said card and means for displaying said personal identification upon the operation of said means for recording.

7. A control system for scoring, as in golf, for operation with a card or the like, bearing a record medium comprising:

a first structure including means for sensing said recording medium to provide signals from a specific card identified with a specific person and representative of a scoring composite for that person, a controlled access input panel for forming signals representative of a current score by said specific person, computer means for receiving said signals representative of a current score and said signals representative of said scoring composite to compute a fresh scoring composite, and means for recording said signals on said card, updated to include said current score; and a second structure physically separate from said first structure and including means for issuing a score sheet and concurrently registering the fact of said issuance on said card.

* * * * *

UNITED STATES PATENT AND TRADEMARK OFFICE

CERTIFICATE OF CORRECTION

PATENT NO. : 4,268,744

DATED : May 19, 1981

INVENTOR(S) : Thomas C. McGeary

It is certified that error appears in the above-identified patent and that said Letters Patent are hereby corrected as shown below:

| Column | Line | |
|---|---|---|
| 3 | 22 | After "number" "of" should be --for--; |
| 11 | 41 | After "through" "and" should be deleted; |
| 11 | 42 | "copper right" should be --(upper right)--; |
| 11 | 49 | "data" should be --date--; |
| 11 | 54-55 | After "144" "certain" should be --contain--; |
| 11 | 56 | "data" should be --date--; |
| 12 | 11 | "HD" should be --HC--. |

Signed and Sealed this

*Fourth* Day of *August 1981*

[SEAL]

*Attest:*

GERALD J. MOSSINGHOFF

*Attesting Officer* *Commissioner of Patents and Trademarks*